(12) United States Patent
Yun

(10) Patent No.: US 7,667,917 B2
(45) Date of Patent: *Feb. 23, 2010

(54) METHOD AND APPARATUS FOR CONTROLLING WRITE PARAMETER ACCORDING TO VOLTAGE VARIATION

(75) Inventor: Jong-Yun Yun, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 407 days.

This patent is subject to a terminal disclaimer.

(21) Appl. No.: 11/700,845

(22) Filed: Feb. 1, 2007

(65) Prior Publication Data

US 2007/0195446 A1    Aug. 23, 2007

(30) Foreign Application Priority Data

Feb. 3, 2006    (KR) .................... 10-2006-0010857

(51) Int. Cl.
*G11B 5/02* (2006.01)
(52) U.S. Cl. ........................ 360/68; 36/31
(58) Field of Classification Search ............... None
See application file for complete search history.

(56) References Cited

U.S. PATENT DOCUMENTS

| 5,218,504 | A  | * | 6/1993  | Kimura ................... 360/137 |
| 6,556,366 | B2 |   | 4/2003  | Patti et al. |
| 6,622,252 | B1 | * | 9/2003  | Klaassen et al. .......... 713/320 |
| 6,847,500 | B2 | * | 1/2005  | Jove et al. .................. 360/46 |
| 2004/0252398 | A1 |   | 12/2004 | Li et al. |
| 2005/0128630 | A1 |   | 6/2005  | Huang et al. |
| 2005/0213243 | A1 |   | 9/2005  | Huang et al. |
| 2006/0215293 | A1 | * | 9/2006  | Kondou ................... 360/46 |
| 2007/0115575 | A1 | * | 5/2007  | Cho et al. .................. 360/46 |
| 2007/0230008 | A1 | * | 10/2007 | Shinomiya et al. ......... 360/66 |

* cited by examiner

*Primary Examiner*—Jason C Olson
(74) *Attorney, Agent, or Firm*—Volentine & Whitt, PLLC

(57) ABSTRACT

Provided is a method and an apparatus for controlling a write parameter according to a voltage variation. The method for controlling the write parameter includes monitoring a voltage supplied to a pre-amplifier before performing a write operation and adjusting the write parameter supplied to the pre-amplifier based on the monitoring result. Controlling the write parameter includes reading a predetermined write parameter from a write parameter table based on the monitoring result, and adjusting the read write parameter to the write parameter which will be supplied to the pre-amplifier.

10 Claims, 2 Drawing Sheets

METHOD AND APPARATUS FOR CONTROLLING WRITE PARAMETER ACCORDING TO VOLTAGE VARIATION

BACKGROUND OF THE INVENTION

1. Field of the Invention

Embodiments of the invention relate to a method and apparatus for controlling a write parameter. More particularly, embodiments of the invention relate to a method and an apparatus capable of controlling a write parameter in accordance with a voltage variation supplied to a pre-amplifier.

This application claims priority under 35 U.S.C. § 119 to Korean Patent Application No. 10-2006-0010857, filed on Feb. 3, 2006, the disclosure of which is hereby incorporated by reference herein in its entirety.

2. Description of the Related Art

Generally, the amplitude of write current supplied to a disc within a Hard Disc Drive (HDD) is defined in relation to the power supplied to an associated pre-amplifier. That is, the rise time (dt) of the write current changes in accordance with a voltage (dv) supplied to the pre-amplifier, as follows:

$$dt = N \frac{di}{dv},$$

where "di" is current and N is a constant related to the number of turns.

As the operating speed of devices, such as HDDs, increases, shorter and shorter write current rise times are required. To reduce the rise time, the supply voltage applied to the pre-amplifier is increased. However, there are well-understood, practical limits on the supply voltage regardless of the operating speed of the overall device. For example, assuming an HDD uses supply voltages of +5V and −5V, the −5V supply voltage may be supplied by a voltage a regulator circuit receiving a supply voltage of 12V. The +5V supply voltage on the other hand may be supplied using a switching mode power supply (SMPS).

Under these assumptions, the −5V supply voltage may be readily and constantly maintained an output from the regulator. However, +5V supply voltage supplied by the SMPS will vary. As this supply voltage varies, so too does the rise time of a write current supplied from the pre-amplifier to a write head of the HDD.

Figure (FIG.) 1 is a graph showing the relation between write current and a Bit Error Rate (BER) as a function of two exemplary voltage variations. Referring to FIG. 1, when the voltage provided by the SMPS is reduced, the rise time for the write current increases, thereby resulting in greater bit errors in the written data. Such a result impairs the reliability of the HDD.

For example, when voltage V2 of FIG. 1, as supplied to the pre-amplifier of an HDD, falls from +5.0V to +4.5V, the bit error rate for the HDD increases significantly over an analogous BER for voltage V1 which is maintained at +5.0V. Therefore, when the voltage supplied to the pre-amplifier decreases from +5.0V to +4.5V, the write current must be increased from 30 mA to 50 mA to compensate.

SUMMARY OF THE INVENTION

In one embodiment, the invention provides a method for controlling a write parameter in a Hard Disc Drive (HDD), the method comprising; monitoring a supply voltage provided to a pre-amplifier in the HDD before performing a write operation and generating a voltage monitoring signal, and controlling the write parameter, as supplied to the pre-amplifier in relation to the voltage monitoring signal.

In another embodiment, the invention provides a write parameter adjusting apparatus adapted for use within a hard disc drive (HDD), comprising; a pre-amplifier, a voltage monitoring unit adapted to detect the level of a supply voltage provided to the pre-amplifier and generate a voltage monitoring signal, and a read/write channel adapted to adjust the write parameter supplied to the pre-amplifier in response to the voltage monitoring signal.

In another embodiment, the invention provides a hard disc drive (HDD) comprising; a disc including a plurality of tracks, a read/write head adapted to access and write data to the plurality of tracks, an actuator driving unit adapted to generate a signal driving an actuator which moves the read/write head, a spindle motor driving unit adapted to generate a signal driving a spindle motor which rotates the disc, a controller adapted to control operation of the actuator driving unit and the spindle motor driving unit in response to signals generated by an associated host interface, and a write parameter adjusting apparatus adapted to detect the level of a supply voltage provided to a pre-amplifier and adjust a write parameter supplied to the pre-amplifier in response to a voltage monitoring signal derived in relation to the detected level of the supply voltage.

DESCRIPTION OF EMBODIMENTS

The invention will now be described in the context of several embodiments illustrated in the accompanying drawings. However, those of ordinary skill in the art will recognize that the invention may be variously embodied. Thus, the following embodiments are presented as teaching examples only and the actual scope of the invention is defined by the claims that follow.

Figure 2:
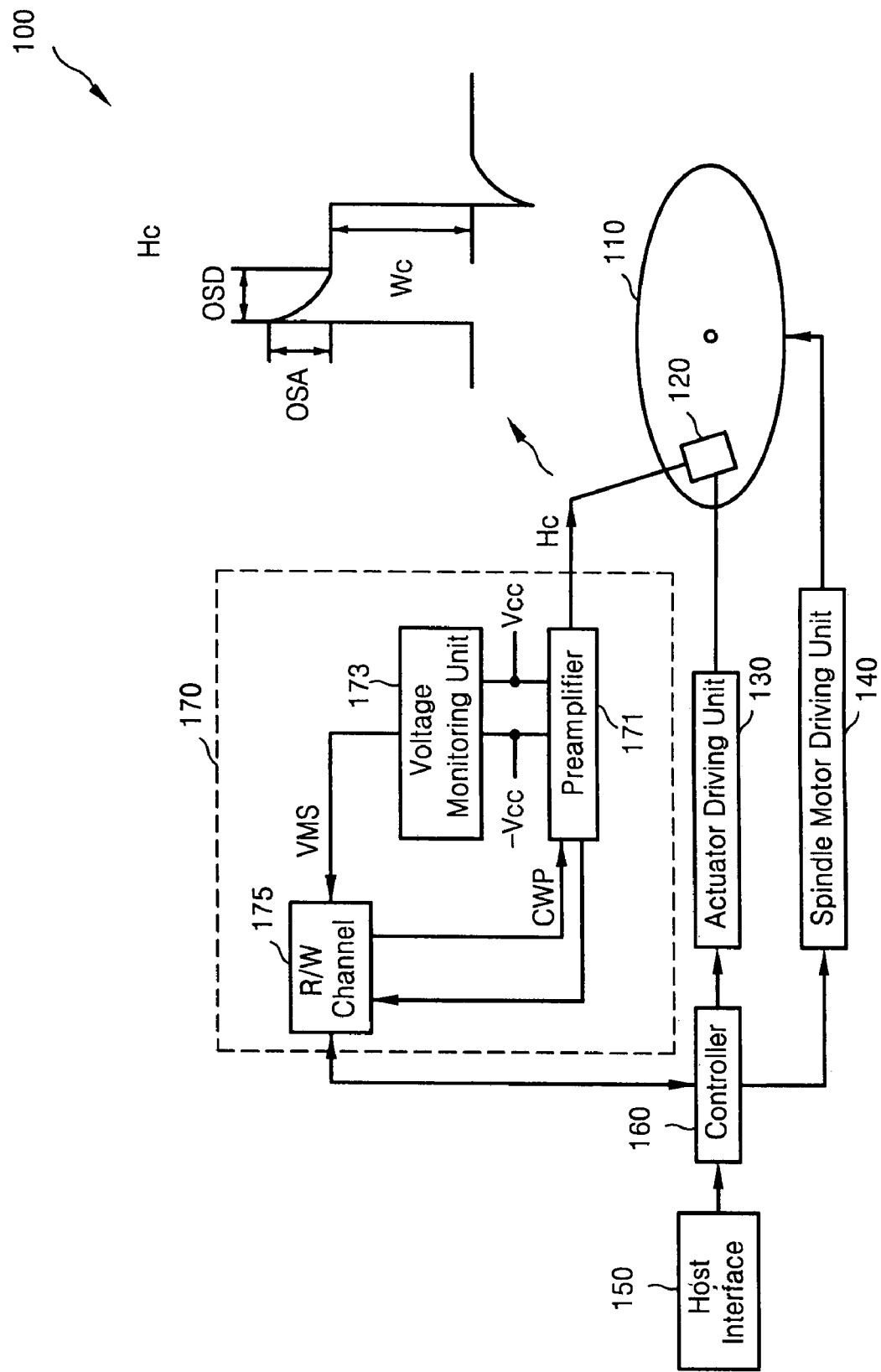
FIG. 2 is a functional block diagram of hard disc drive including a write parameter adjusting apparatus according to an embodiment of the present invention.

FIG. 2 is a functional block diagram of a hard disc drive (HDD) including a write parameter adjusting apparatus according to an embodiment of the present invention.

Referring to FIG. 2, HDD 100 comprises a disc 110, a read/write head 120, an actuator driving unit 130, a spindle motor driving unit 140, a host interface 150, a controller 160, and the write parameter adjusting apparatus 170.

Disc 110 typically includes a plurality of tracks (or cylinders) where data are recorded. Read/write head 120 includes a read head (or a read element) and a write head (or a write element) and is adapted to record (or write) data onto a track selected from amongst the plurality of the tracks, as well as read data previously recorded on the tracks of disc 110.

Actuator driving unit 130 outputs a signal adapted to drive an actuator (not shown) which conventionally operates read/write head 120 under the control of controller 160. Spindle motor driving unit 140 outputs a signal adapted to drive a spindle motor (now shown) which rotates disc 110 under the control of controller 160. Host interface 150 receives commands output from a host device (e.g., a personal computer) to an HDD 100 and communicates the received commands to controller 160.

Controller 160 controls the general operation of HDD 100 in response to the commands received through host interface 150. Controller 160 (as well as read/write channel 175) may be conventionally implemented in software, firmware, a digital signal processor DSP, a microprocessor, etc.

Write parameter adjusting apparatus 170 monitors the level of voltages Vcc and/or −Vcc applied to pre-amplifier 171. In anticipation of a pending write operation, a write parameter signal voltage is adjusted (increased or decreased) in response to feedback signal provided through a voltage monitoring unit 173.

Write parameter adjusting apparatus 170, thus, includes a pre-amplifier 171, a voltage monitoring unit 173, and a read/write channel 175. Pre-amplifier 171 generates a read/write head current (HC) by appropriately amplifying a current supplied to read/write head 120. Read/write head 171 also amplifies and communicates data read from disc 110 to Read/Write channel 175.

Voltage monitoring unit 173 detects the level of the voltage(s) Vcc and/or −Vcc supplied to pre-amplifier 171 and communicates a corresponding voltage monitoring signal VMS to read/write channel 175. Voltage monitoring unit 173 may be implemented as an analog to digital converter, but is not restricted thereto. Voltage monitoring unit 173 may alternately be implemented in software.

Since voltage monitoring unit 173 detects the level of supply voltages provided to pre-amplifier 171, it is able to identify various power modes defined by the host device (e.g., an incorporating PC). Thus, when a transition from a power saving mode to an operational mode is detected, HDD 100 wakes up and prepares to perform a write operation in response to detected changes in the supply voltages provided to pre-amplifier 171. The feedback results provided by voltage monitoring unit 173 in this regard may also be communicated to the host device through read/write channel 175 and/or host interface 150.

Read/write channel 175 is adapted to adjust one or more write parameter(s) (e.g., read/write head current) in response to the voltage monitoring signal VMS, and output the adjusted write parameter CWP to pre-amplifier 171. Read/write channel 175 is further adapted to process various signals that arise when data is read from disc 110 under the control of controller 160 or various signals that arise when data is written to disc 110. Such read/write signals are well understood by those of ordinary skill in the art.

In one embodiment, the write parameter(s) include a read/write head current defined by a write current (Wc), an overshoot amplitude (OSA), and an overshoot duration (OSD). An exemplary read/write head current defined by these terms is shown in FIG. 2. Read/write channel 175 may adjust any one or more of the write current (Wc), overshoot amplitude (OSA), or overshoot duration (OSD) to appropriately define the read/write head current.

Read/write channel 175 may be implemented in the form of one or more look-up tables defining a plurality of write parameters. Each defined write parameter thus corresponds to a supply voltage provided to pre-amplifier 171. In one embodiment the write parameter look-up table may be implemented in a data structure stored in non-volatile memory, such as a ROM.

In one embodiment, a supply voltage is provided to pre-amplifier 171 and ranges between 4.0V and the 5.0V. Each supply voltage may be adjusted in predetermined intervals such as a 0.1V interval, 0.2V interval, or 0.5V interval, etc. during the HDD manufacturing process to optimize the write parameter in view of the look-up table contents and desired write functionality. Alternatively, a write parameter may be optimized based on statistical data. Of further note, a corresponding parameter table may exist outside of read/write channel 175.

With the foregoing set-up or similar arrangements, read/write channel 175 reads a predetermined write parameter from among the stored write parameter values in the write parameter look-up table in relation to the voltage monitoring signal VMS output from voltage monitoring unit 173, and accordingly supplies the appropriate write parameter to pre-amplifier 171.

In one embodiment, read/write channel 175 may supply a write current Wc of 50 mA as a write parameter to pre-amplifier 171 when the supply voltage Vcc provided to pre-amplifier 171 is 4.0V. Read/write channel 175 may supply a write current Wc of 30 mA as a write parameter to pre-amplifier 171 when the supply voltage Vcc provided to pre-amplifier 171 is 4.5V. Finally, read/write channel 175 may supply a write current Wc of 25 mA to the pre-amplifier 171 as a write parameter when the supply voltage Vcc provided to pre-amplifier 171 is 5.0V.

Figure 1:
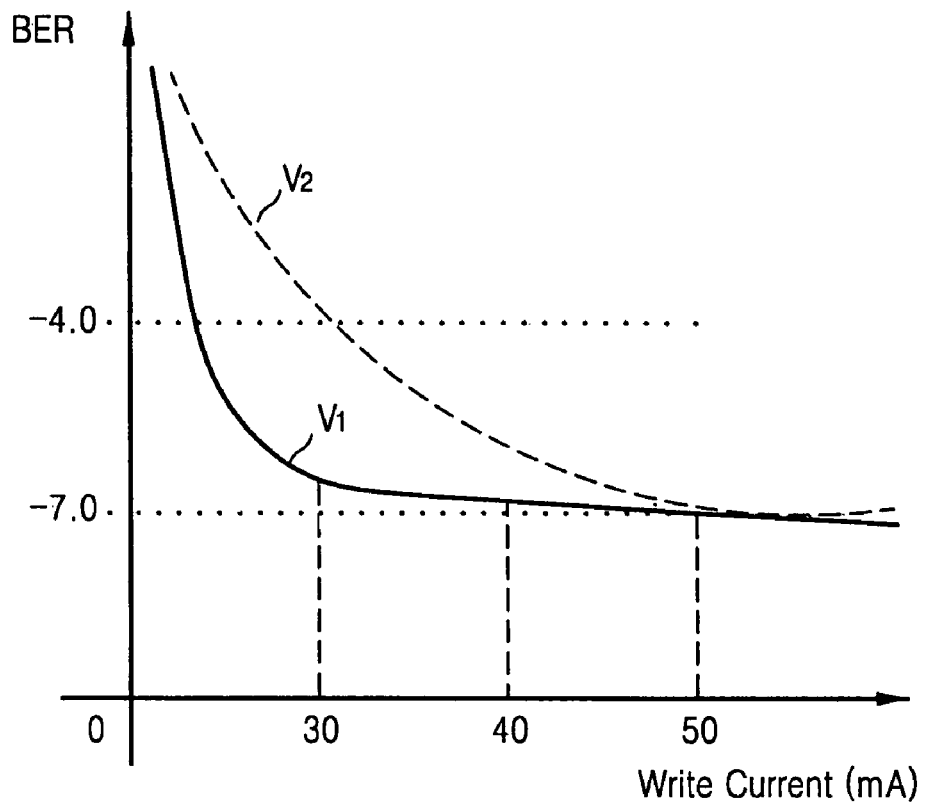
FIG. 1 is a graph showing a relation between a write parameter and a BER according to a voltage change.
Figure 3:
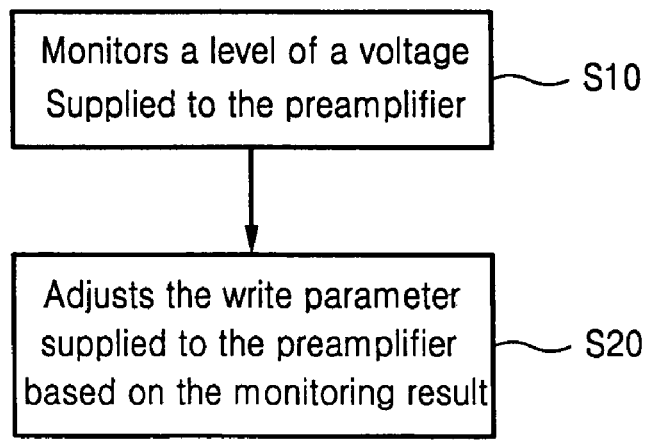
FIG. 3 is a flow chart showing a method for controlling a write parameter according to an embodiment of the present invention.

FIG. 3 is a flow chart illustrating a method of controlling a write parameter according to an embodiment of the present invention. Referring collectively to FIGS. 2 and 3, voltage monitoring unit 173 detects the respective levels of supply voltages Vcc and/or −Vcc provided to pre-amplifier 171 prior to the execution of a write operation (S10).

Read/write channel 175 then adjusts the write parameter (e.g., the amplitude of a read/write head voltage or current) supplied to pre-amplifier 171 based on the voltage monitoring signal VMS.

As described above, the exemplary embodiments are drawn to write operations and associated signals and parameters. However, those of ordinary skill in the art may readily apply the foregoing teachings to read operations and associated read parameters.

The invention can also be embodied, in part or in whole, as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices.

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention, the method and the apparatus for controlling a write parameter may monitor the level of a supply voltage provided to a pre-amplifier, and control a write parameter supplied to the pre-amplifier in accordance with the monitoring result. Thereby, an abrupt degradation in the BER of the HDD caused by a decrease in supply voltage may be avoided.

Also, the method and the apparatus for controlling a write parameter according to the present invention may monitor the level of a supply voltage provided to a pre-amplifier and control a write parameter supplied to the pre-amplifier according to the monitoring result. Accordingly, the method and the apparatus for controlling a write parameter according to the present invention improves the reliability of the hard disc drive.

While the present invention has been particularly shown and described with reference to exemplary embodiments thereof, it will be understood by those of ordinary skill in the art that various changes in form and details may be made therein without departing from the scope of the present invention as defined by the following claims.

What is claimed is:

1. A method for controlling a write parameter in a Hard Disc Drive (HDD), the method comprising:
   monitoring a supply voltage provided to a pre-amplifier in the HDD before performing a write operation and generating a voltage monitoring signal; and
   controlling the write parameter, as supplied to the pre-amplifier in relation to the voltage monitoring signal.

2. The method according to claim 1, wherein monitoring the supply voltage comprises using an analog to digital converter.

3. The method according to claim 1, wherein, in controlling the write parameter comprises controlling at least one of a write current, an overshoort amplitude, and an overshoot duration.

4. The method according to claim 1, wherein, in controlling the write parameter comprises increasing the write parameter supplied to the pre-amplifier when the supply voltage decreases, as indicated by the voltage monitoring signal.

5. The method according to claim 1, wherein controlling the write parameter comprising:
   using the voltage monitoring signal to read a predetermined write parameter from a write parameter look-up table; and
   adjusting the write parameter in accordance with the predetermined write parameter.

6. A computer readable medium storing a program adapted to execute the method for controlling the write parameter defined in claim 1.

7. A write parameter adjusting apparatus adapted for use within a hard disc drive (HDD), comprising:
   a pre-amplifier;
   a voltage monitoring unit adapted to detect the level of a supply voltage provided to the pre-amplifier and generate a voltage monitoring signal; and
   a read/write channel adapted to adjust the write parameter supplied to the pre-amplifier in response to the voltage monitoring signal.

8. The apparatus according to claim 7, wherein the voltage monitoring unit is an analog to digital converter.

9. A hard disc drive (HDD) comprising:
   a disc including a plurality of tracks;
   a read/write head adapted to access and write data to the plurality of tracks;
   an actuator driving unit adapted to generate a signal driving an actuator which moves the read/write head;
   a spindle motor driving unit adapted to generate a signal driving a spindle motor which rotates the disc;
   a controller adapted to control operation of the actuator driving unit and the spindle motor driving unit in response to signals generated by an associated host interface; and
   a write parameter adjusting apparatus adapted to detect the level of a supply voltage provided to a pre-amplifier and adjust a write parameter supplied to the pre-amplifier in response to a voltage monitoring signal derived in relation to the detected level of the supply voltage.

10. The hard disc drive according to claim 9, wherein the write parameter adjusting apparatus comprises:
    a voltage monitoring unit adapted to detect the level of the supply voltage provided to the pre-amplifier and generate a corresponding voltage monitoring signal; and
    a read/write channel adapted to adjust a write parameter supplied to the pre-amplifier in response to the voltage monitoring signal.

* * * * *